United States Patent [19]

Vie

[11] 3,983,331

[45] Sept. 28, 1976

[54] SWITCH HAVING A MATRIX OF RELAYS

[75] Inventor: Christian Vie, St.-Cyr-l'Ecole, France

[73] Assignee: Compagnie Industrielle des Telecommunications Cit-Alcatel, France

[22] Filed: Sept. 20, 1974

[21] Appl. No.: 507,958

[30] Foreign Application Priority Data

Sept. 20, 1973 France .............................. 73.33808

[52] U.S. Cl. .............................................. 179/18 GE

[51] Int. Cl.[2] ............................................ H04Q 3/42

[58] Field of Search .................... 179/18 GE, 18 GF; 340/166 R

[56] References Cited

UNITED STATES PATENTS

| | | | |
|---|---|---|---|
| 2,578,701 | 12/1951 | Hecht | 340/166 R |
| 3,366,849 | 1/1968 | De Raedt et al. | 340/166 R |
| 3,621,147 | 11/1971 | Perucca | 179/18 GE |

*Primary Examiner*—Thomas A. Robinson
*Attorney, Agent, or Firm*—Craig & Antonelli

[57] ABSTRACT

Switch comprising a matrix of relays, each providing a connection point between a horizontal input and a vertical input, and auxiliary control relays, at least one per vertical input, fulfilling the horizontal and vertical input control functions and the holding of the vertical input control and the releasing of the horizontal input control.

17 Claims, 5 Drawing Figures

SWITCH HAVING A MATRIX OF RELAYS

The invention concerns a switch comprising a matrix of relays, each providing a connection point between an input known as a "horizontal" input and an input known as a "vertical" input, and auxiliary control relays. That switch may be built into a conventional switching system, more particularly in the place of Crossbar switches.

The invention may be used mainly in automatic exchanges in telephony and in telegraphy.

In the known art of Crossbar type switching systems, the set of connection points of a vertical input is controlled by a single electromagnet under the control of one connecting mechanism per connection point, itself controlled by the electromagnet of the horizontal row to which it belongs. The reliability and the rapidity of operation of these switches are limited due to the numerous mechanical parts which they comprise.

Switches with matrixes of relays having a small size, such as sealed bulb relays, or wire relays used mainly in systems controlled by a computer, are also known.

The aim of the invention is to produce a switch which has a very versatile use and benefits by the same technical advantages as the already known small-size relays, namely, the almost complete dispensing with the mechanical parts and the implanting of the switch on a plug-in type printed circuit card.

The present invention has for its object a switch more particularly for telecommunications, formed by a rectangular matrix of main relays each controlling one of the points of connection to several wires between a set of inputs called horizontal inputs and a set of inputs called vertical inputs, characterized in that it comprises a control device formed by two auxiliary relays for each group of main relays belonging to a same vertical input, namely a contact relav and a holding relay, that device making it possible to fulfill the functions of a Crossbar switch: control of the horizontal input and control of the vertical input, holding of the vertical control and releasing of the horizontal control.

A switch according to the invention will be described by way of an example with reference to the following figures.

Figure 1:
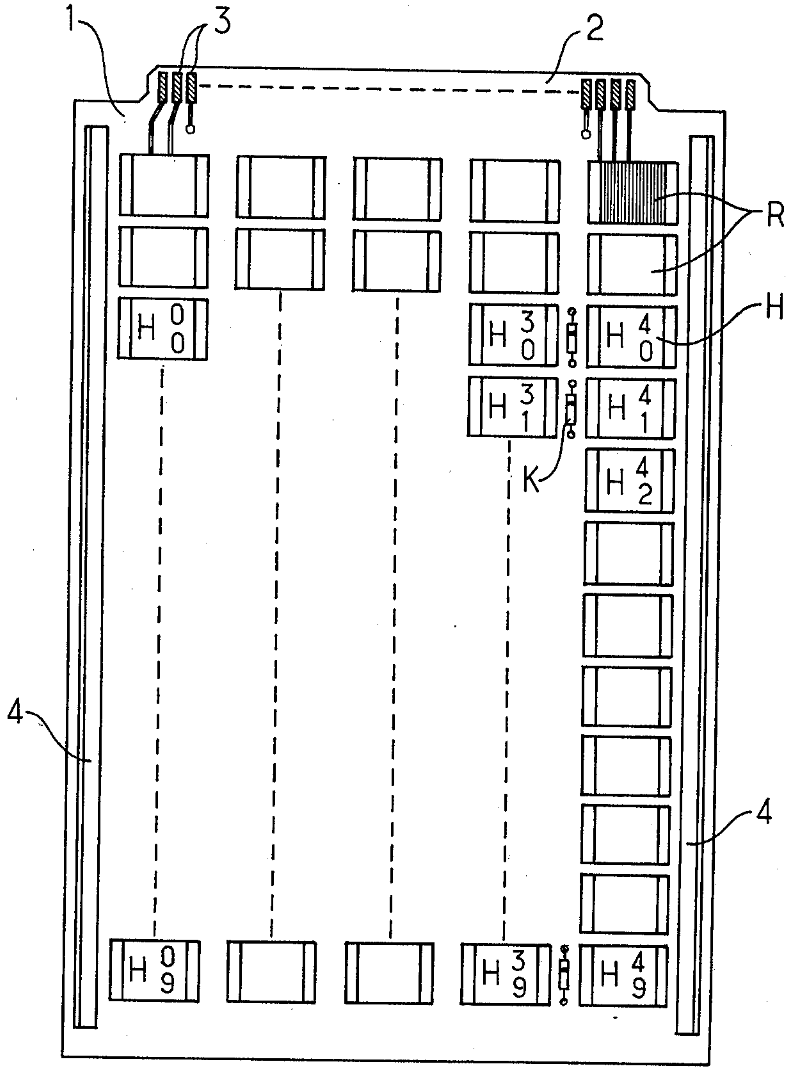
FIG. 1 is a plan view of a relay card forming a switch according to the invention.
Figure 2:
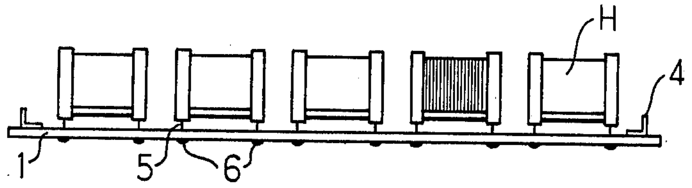
FIG. 2 shows the relay card seen from the end.

The switch shown in FIG. 1 and 2 is formed by a matrix of 10 × 5 relays H, that is, of 10 horizontal inputs and 5 vertical inputs and by a set of 2 × 5 auxiliary relavs R, with two relays R per vertical input. The relays H and R are installed by their connection tails 5 on a circuit card 1. That card 1 bears, on its plug in part 2, the connection points 3 of the switch with the other elements of the system.

The printed connections may be formed on the two faced of the card and electrical components K may be installed between the rows of relays.

Edges 4 in the shape of angle irons are intended to act as stiffening braces for the card and are also used for the fixing of a protective hood.

Figure 3:
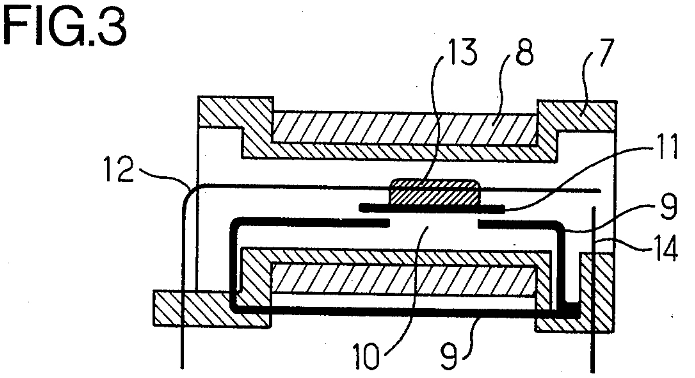
FIG. 3 is a diagrammatic illustration of one of the relays used in the example described.

The relays H and R are wire relays of a known type (FIG. 3). They comprise a frame 7, a winding 8 having one or several coils and a magnetic circuit 9 in the form of a rectangular ring passing on the outside of the relay and folded back on the inside of the frame so as to leave a cut 10 which may be closed by a mobile armature 11. The contacts are formed by fixed pins 14 and mobile wires 12 fixed to the armature 11 by an overmoulding 13. The passing of a feed current in the winding 8 causes the attracting of the armature by the magnetic circuit and the closing of the contacts. The wires 12 form a spring and bring the armature backwards when the feed current is cut.

The particular switch described makes switching with four wires possible. The relays used for the matrix comprise four make contacts and two windings, one for the contacting and the second for the holding of the relay.

Figure 4:
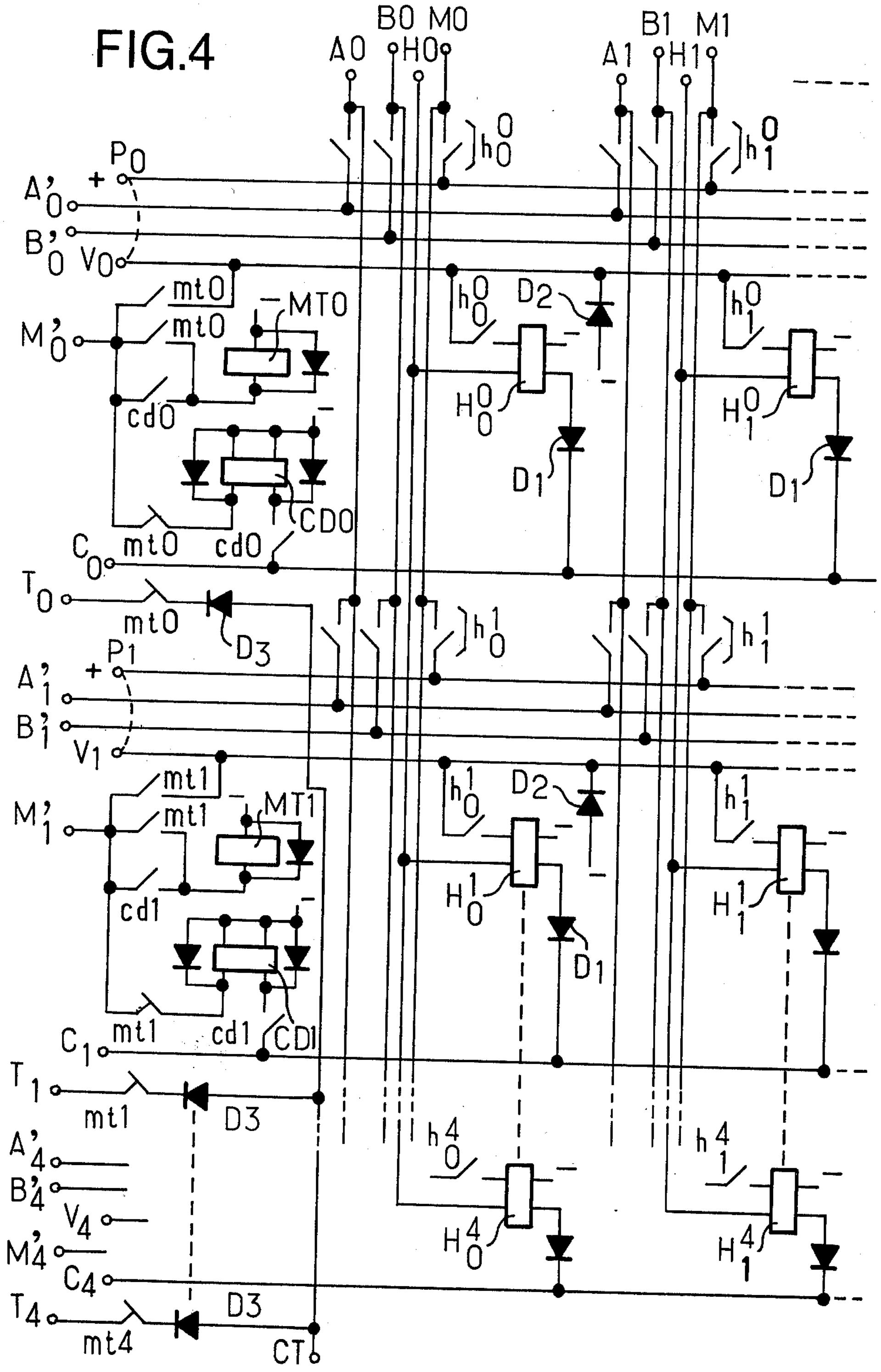
FIG. 4 is the wiring diagram of that switch.

The relays H are references in FIG. 4 with two indexes, the lower index showing the order of the horizontal input to which the relay belongs and the upper index showing the order of the vertical input. The corresponding contacts h are referenced with the same indexes.

Two of the contacts of these relays are used for the connecting of the line wires; a third is used for controlling the hold winding and the fourth is used for the sending of a control polarity towards another selection stage, intended to enable the installing of a connection on several stages in series by a single control.

A horizontal input comprises four points $A_0$, $B_0$, $H_0$, $M_0$, (AO, BO, HO, MO to A9, B9, H9, M9 for the 10 inputs): the points $A_0$ and $B_0$ used for the line wires are connected (FIG. 4) each to a make contact $h_0^0$ of each of the five relays H of the horizontal input. The point $H_0$ is connected to a terminal of the contact winding of these five relays $H_0^0$ to $H_0^4$. The point $M_0$ is connected to a make contact of each of the relays H of the horizontal input, the blades of these contacts being connected to an earth polarity existing at a point $P_0$ of the vertical input (P0 to P4 for the five vertical inputs).

A vertical input comprises four points $A_0'$, $B_0'$, $M_0'$, $T_0$ (A'0, B'0, M'0, T0 to A'4, b'4, M'4, T4). The points $A_0'$ and $B_0'$ are connected to the blades of the contacts intended for the line wires of the ten relays H ($H_0^0$ to $H_9^0$) belonging to that vertical input. The point $M_0'$ receives the control polarity of the vertical input and the point $T_0$ is used for the availability test on the vertical input.

The control system of the matrix of the relays H is formed by two auxiliary relays per vertical input, a control relay $CD_0$ (CD0 to CD4) and a holding relay $MT_0$ (MT0 to MT4):

The relay CD0 comprises two windings having one common end at the negative polarity of the supply source. The other end of the first winding is connected to the point M'0 through a break contact of the relay MT0. The other end of the second winding is connected, through a make contact *cd*0, to a point C0 assigned to the vertical input 0. Ten links connect the point C0 to the ten points H0 to H9 of the horizontal inputs, each link passing through a diode D1 intended to prevent any return of current and through the contact winding of one of the relays $H_0^0$ to $H_9^0$;

The relay MT0 has a single winding connected to the negative polarity and to the point M'0 through two make contacts in parallel, a contact cd0 and one of its own contacts *mt*0. Another contact *mt*0 of the relay MT0 connects the point M'0 to a point V0 assigned to the vertical input 0;

Lastly, each of the relays $H_0^0$ to $H_9^0$ of the vertical input 0 may be held on its second winding connected up between the point V0 and the negative polarity through one of its own make contacts.

The control circuits of the vertical inputs 1 to 4 are identical to that of the vertical input 0.

The test wires T0 to T4 are connected up to a common point CT, receiving a polarity intended for the test, each through a break contact respectively *mt*0 to *mt*4 of the relays MT0 to MT4 and through diodes D3 avoiding mixtures by return of current.

The operation of the switch in a conventional system in the place of a Crossbar switch is as follows:

Assuming that it is required to control the horizontal input 1 and the vertical input 0, after having verified the existence of the test polarity at the point T0 showing the availability of the vertical input 0. Earth or control polarities are applied to the points H1 and M'0.

The relay CD0, supplied through the break contact *mt*0, rises;

$H_1^0$ rises, in series with the second winding of CD0, the diode D1 and a make contact *cd*0; that contact *cd*0 makes it possible to isolate the relay CD0 with respect to the horizontal control at one of the points H0 to H9 as long as the vertical control at the point M'0 has not appeared. This makes it possible, as in Crossbar systems, when the similar inputs of several switches are multiple connected together, to multiple connect also the similar points H0 to H9, this limiting to 10 the number of control wires, instead of $10 \times n$ for $n$ switches used in parallel;

MT0 rises, controlled by a make contact *cd*0, cuts the supply of the first winding of CD0 and ensures the holding thereof by the make contact *mt*0, in parallel with the contact *cd*0;

The holding winding of $H_1^0$ is fed, by a make contact *mt*0 and a make contact $h_1^0$, from the point M'0;

The earth polarity of the point P0 is transmitted to the point $M_1$ by a make contact $h_1^0$;

It is also possible to subordinate the controlling of the points M0 to M9 to the rising of the relay MT corresponding to the vertical input engaged by cancelling the polarities from the points P0 to P4 and by connecting these points respectively to the points V0 to V4, these connections being shown by discontinuous lines in FIG. 4.

On the cancelling of the horizontal control at the point H1, the relay CD0 falls back and $H_1^0$ remains in the raised position on its holding winding, starting from the polarity existing at the point M'0. When it is required to cut the connection, the polarity at M'0 is cancelled. As in conventional systems, it is possible to cut off a chain as a whole established through several selection stages by the cancelling of a single polarity at one end or in the middle of that chain.

The switch according to the invention makes it possible also to form larger matrixes by the combining of several switches.

Figure 5:
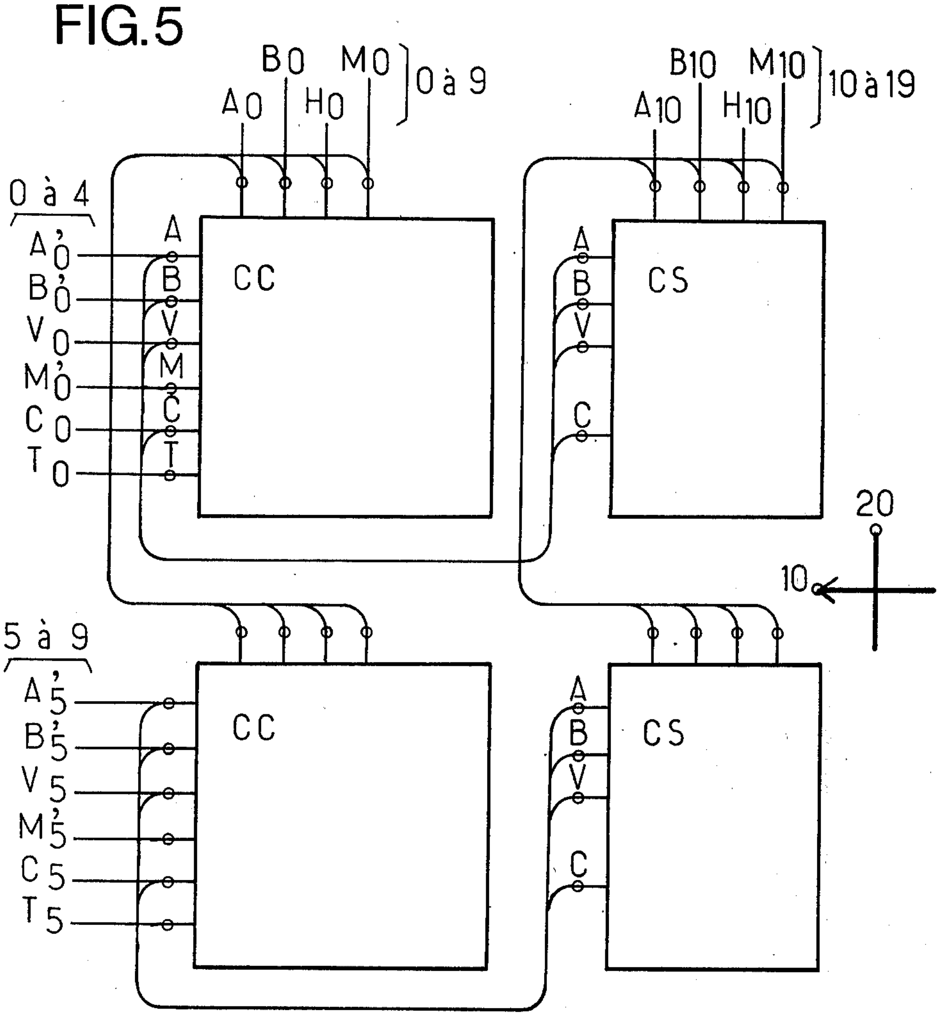
FIG. 5 shows an example of the combining of four switches forming a larger matrix.

Such a matrix is show in FIG. 5; it is formed by four $10 \times 5$ switches forming a $20 \times 10$ matrix, that is, a matrix of 20 horizontal inputs and 10 vertical inputs. To control the 10 vertical inputs of that assembly, it is sufficient to have 10 relays CD and 10 relays MT; it will therefore be possible to use two simplified switches CS not comprising any relay CD and MT.

To enable that grouping, switch support cards CC and CS for the output points for the control wires, that is, for the points V0 to V4 and C0 to C4 have been provided on the plug-in part of the support cards for the switches CC and CS.

It is thus possible to form high-capacity assemblies by increasing:

The capacity of the vertical outputs, by connecting together a switch CC and several switches CS. It is then sufficient to interconnect respectively the points A', B', V, C of these switches;

The number of vertical inputs, by multiplying the points A B H M of each horizontal input.

The invention is in no way limited to the embodiments described by way of an example. It is applicable to matrixes of relays of any dimensions, forming crossing points having at least three wires.

I claim:

1. A switch for use in telecommunications comprising a matrix of main relays including rows and columns of said main relays, each of said main relays controlling a multi-channel connection at a junction of said rows and said columns of said matrix, and each of said main relays being controlled by a row control signal applied to respective rows of said main relays of said matrix and by a column control signal applied to respective columns of said main relays of said matrix; and control means for controlling said main relays, said control means including two auxiliary relays for each column, a first of said two auxiliary relays effecting operation of a main relay being controlled by both said row control signal and said column control signal, and a second of said two auxiliary relays effecting a holding of the operation of said main relay by means of only said column control signal.

2. A switch according to claim 1, wherein each of said main relays in a wire relay having a contact winding and a holding winding.

3. A switch according to claim 1, wherein said second of said two auxiliary relays includes a holding relay, said holding relay having a break contact for availability testing of an input to the respective column.

4. A switch according to claim 1, wherein each of said main relays include a make contact for controlling a predetermined polarity to said row control signal such that chain controlling of several selection stages is achieved.

5. A switch according to claim 1, wherein said switch is grouped with a plurality of similar switches such that said matrix of main relays is increased in capacity, wherein the rows of said switches are multiply connected, and wherein said columns are extended by vertical combination of at least one additional matrix of main relays.

6. A switch according to claim 1, wherein said first auxiliary relay effects operation of said second auxiliary relay.

7. A switch according to claim 1, wherein said second auxiliary relay effects holding of said first auxiliary relay.

8. A switch according to claim 1, wherein said second auxiliary relay maintains control of said main relay by said column control signal after cancelling said row control signal applied to said main relay.

9. A switch for use in telecommunications comprising a matrix of main relays including rows and columns of said main relays, each of said main relays controlling a multi-channel connection at a junction of said rows and said columns of said matrix, and each of said main relays being controlled by a row control signal applied to respective rows of said main relays of said matrix and by a column control signal applied to respective columns of said main relays of said matrix; and control means for controlling said main relays, said control means including two auxiliary relays for each column, a first of said two auxiliary relays effecting operation of a main relay being controlled by both said row control signal and said column control signal, and a second of said two auxiliary relays effecting a holding of the operation of said main relay by means of only said column control signal, wherein said first of said two auxiliary relays includes a contact relay having two windings, one terminal of each of said two windings being connected to a supply source, a second terminal of one of said two windings being operatively connected to each of said main relays in the respective column of said matrix associated with said two auxiliary relays, and a second terminal of a second of said two windings being operatively connected to said column control signal, and wherein said second of said two auxiliary relays includes a holding relay having a single winding, said single winding being operatively connected in series between said supply source and said column control signal.

10. A switch according to claim 9, wherein said contact relay is operatively connected to each of said main relays in said respective column by a first make contact of said contact relay and a diode, and wherein said contact relay is operatively connected to said column control signal by a break contact of said holding relay.

11. A switch according to claim 10, wherein said single winding of said holding relay includes a first terminal connected to said supply source and a second terminal connected to said column control signal by a second make contact of said contact relay connected in parallel to a second make contact of said holding relay.

12. A switch according to claim 10, wherein each of said main relays includes a contact winding and a holding winding, and wherein said diode is connected between said first make contact of said contact relay and one terminal of said contact winding of said main relay.

13. A switch according to claim 12, wherein said diode includes a cathode connected to said first make contact of said contact relay and an anode connected to said one terminal of said contact winding of said main relay.

14. A switch according to claim 12, wherein said contact winding of said main relay includes a second terminal operatively connected to said row control signal.

15. A switch according to claim 12, wherein said holding winding of said main relay includes a first terminal operatively connected to said supply source and a second terminal operatively connected in common with the second terminals of said holding winding of each of said main relays in said respective column, and wherein said second terminal of each of said main relays in said respective column are operatively connected in common by a make contact of the respective main relay.

16. A switch according to claim 15, wherein the commonly connected second terminals of said main relays of said respective column are operatively connected with said column control signal by a first make contact of said holding relay.

17. A switch according to claim 16, wherein said single winding of said holding relay includes a first terminal connected to said supply source and a second terminal connected to said column control signal by a second make contact of said contact relay connected in parallel to a second make contact of said holding relay.

* * * * *